(12) United States Patent
Birnbaum et al.

(10) Patent No.: US 9,965,537 B2
(45) Date of Patent: May 8, 2018

(54) SYSTEM AND METHOD OF PROVIDING A SNAPSHOT OF DATA AND REPLAYING THE DATA

(71) Applicant: 60East Technologies, Inc., Las Vegas, NV (US)

(72) Inventors: Jeffrey M. Birnbaum, New York, NY (US); Brand Hunt, Las Vegas, NV (US)

(73) Assignee: 60EAST TECHNOLOGIES, INC., Las Vegas, NV (US)

( * ) Notice: Subject to any disclaimer, the term of this patent is extended or adjusted under 35 U.S.C. 154(b) by 348 days.

(21) Appl. No.: 14/639,947

(22) Filed: Mar. 5, 2015

(65) Prior Publication Data

US 2015/0254318 A1 Sep. 10, 2015

Related U.S. Application Data

(60) Provisional application No. 61/948,452, filed on Mar. 5, 2014.

(51) Int. Cl.
*G06F 17/00* (2006.01)
*G06F 17/30* (2006.01)

(52) U.S. Cl.
CPC .............................. *G06F 17/30575* (2013.01)

(58) Field of Classification Search
CPC ............. G06F 11/1471; G06F 2201/84; G06F 2201/80; G06F 17/30575; G06F 11/2094
See application file for complete search history.

(56) References Cited

U.S. PATENT DOCUMENTS

2005/0055603 A1* 3/2005 Soran ................... G06F 3/0608
714/6.32

* cited by examiner

*Primary Examiner* — Truong Vo
(74) *Attorney, Agent, or Firm* — Bryan Cave LLP

(57) ABSTRACT

A method including: receiving one or more first transactions at the computer replay system from one or more data sources; storing the one or more first transactions in a transactional database; updating a current state of one or more first records in a historical database based on the one or more first transactions; receiving a request from a first user for a replay of the data starting at a first moment; determining a state of the one or more first records in the historical database at the first moment; providing the state of the one or more first records at the first moment to the first user; determining one or more second transactions in the transactional database that occurred after the first moment; and providing sequentially the one or more second transactions to the first user. Other embodiments are provided.

20 Claims, 8 Drawing Sheets

SYSTEM AND METHOD OF PROVIDING A SNAPSHOT OF DATA AND REPLAYING THE DATA

CROSS-REFERENCE TO RELATED APPLICATIONS

This application claims the benefit of U.S. Provisional Application No. 61/948,452, filed Mar. 5, 2014. U.S. Provisional Application No. 61/948,452 is incorporated herein by reference in its entirety.

TECHNICAL FIELD

This disclosure relates generally to tracking data, and relates more particularly to replaying historical data records and/or transactions.

BACKGROUND

Data systems generally store data records, which can be added, removed, and/or updated through data transactions. Many data systems do not provide historical information about the transactions that have occurred or the state of the data at historical points in time. Such historical information can be ascertained from certain data systems through complicated parsing of transaction records, but generally cannot be provided in a rapid manner.

BRIEF DESCRIPTION OF THE DRAWINGS

To facilitate further description of the embodiments, the following drawings are provided in which.

Figure 1:
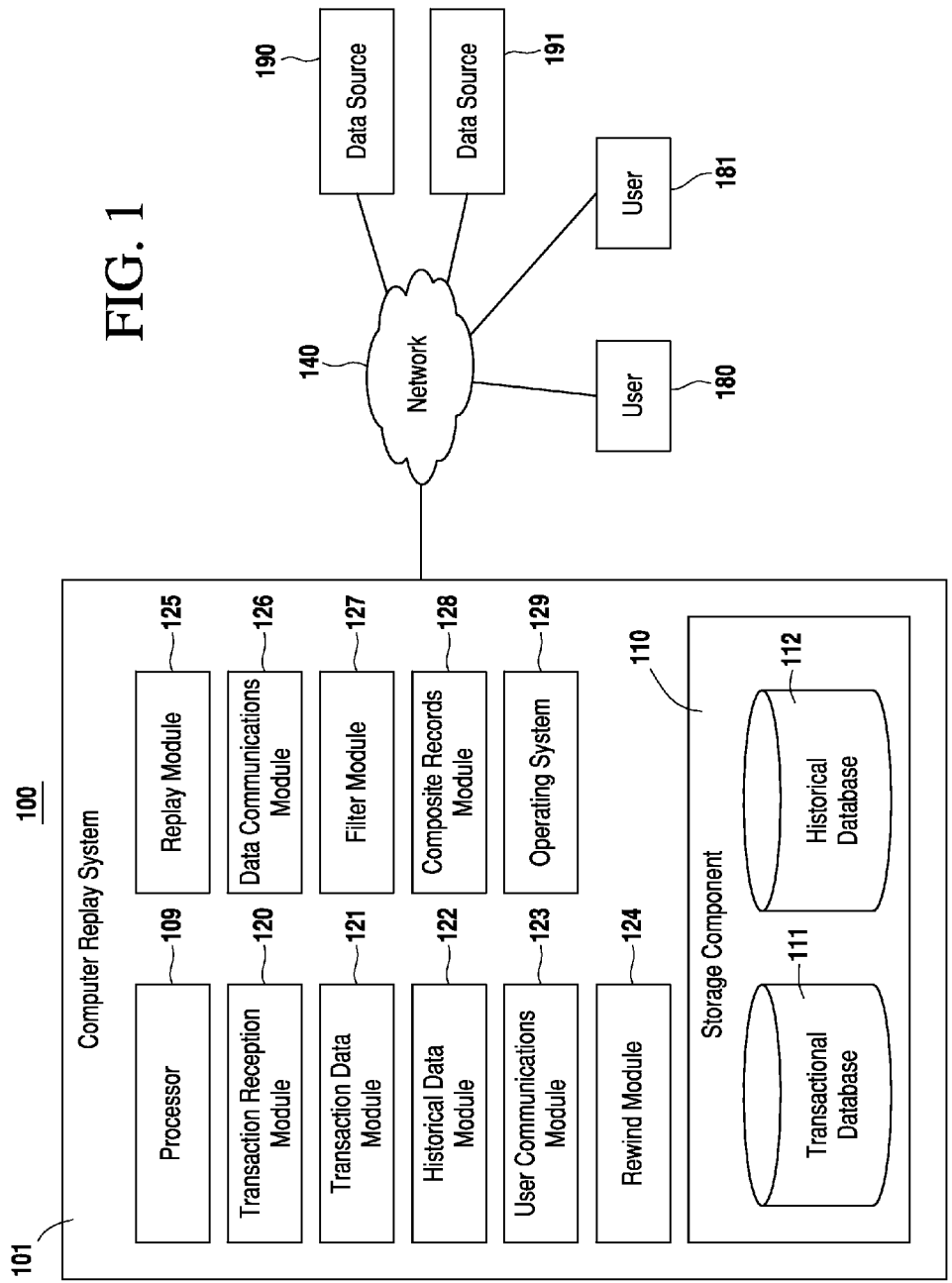
FIG. 1 illustrates a block diagram of a historical query and subscription system, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data and/or one or more transactions necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, or thirty seconds.

DESCRIPTION OF EXAMPLES OF EMBODIMENTS

Various embodiments include a method of providing a snapshot of data at a specific moment and replaying at least part of the data to a user using a computer replay system. The method can be implemented via execution of computer instructions configured to run at one or more processing modules and configured to be stored at one or more non-transitory memory storage modules. The method can include receiving one or more first transactions at the computer replay system from one or more data sources. The method also can include storing the one or more first transactions in a transactional database. The method additionally can include updating a current state of one or more first records in a historical database based on the one or more first transactions. The method further can include receiving a request from a first user for a replay of the data starting at a first moment. The method additionally can include determining a state of the one or more first records in the historical database at the first moment. The method further can include providing the state of the one or more first records at the first moment to the first user. The method additionally can include determining one or more second transactions in the transactional database that occurred after the first moment. The method further can include providing sequentially the one or more second transactions to the first user.

A number of embodiments can include a computer replay system configured to provide a snapshot of data at a specific moment and replaying a subsequent part of the data to one or more users. The computer replay system can include one or more processing modules and one or more non-transitory memory storage modules storing computing instructions configured to run on the one or more processing modules and perform various acts. The acts can include receiving one or more first transactions at the computer replay system from one or more data sources. The acts also can include storing the one or more first transactions in a transactional database. The acts additionally can include updating a current state of one or more first records in a historical database based on the one or more first transactions. The acts further can include receiving a request from a first user for a replay of the data starting at a first moment. The acts additionally can include determining a state of the one or more first records in the historical database at the first moment. The acts further can include providing the state of the one or more first records at the first moment to the first user. The acts additionally can include determining one or more second transactions in the transactional database that occurred after the first moment. The acts further can include providing sequentially the one or more second transactions to the first user.

Turning to the drawings, FIG. 1 illustrates a block diagram of a historical query and subscription system 100, according to a first embodiment. Historical query and subscription system 100 is merely exemplary and is not limited to the embodiments presented herein. The historical query and subscription system can be employed in many different embodiments or examples not specifically depicted or described herein.

In many embodiments, historical query and subscription system 100 can include a computer replay system 101, one or more users (e.g., 180-181), one or more data sources (e.g., 190-191), and/or a network 140. In some embodiments, historical query and subscription system 100 can be configured to provide a snapshot of data at a specific moment and replay the data after that moment to the one or more users (e.g., 180-181). In some examples, the data can be received from the one or more data sources (e.g., 190-191). For example, the data can include one or more transactions, which can add, delete, and/or update one or more records.

In some embodiments, computer replay system 101 can be in data communication with the one or more users (e.g., 180-181) and/or the one or more data sources (e.g., 190-191) through network 140. In a number of embodiments, network 140 can be a local area network (LAN), a wireless LAN, a wide area network (WAN), a mobile telecommunications wireless data network, the Internet, another suitable network, or a combination thereof. In other embodiments, computer replay system 101 and the one or more data sources (e.g., 190-191) can be and/or operate on the same device. In other embodiments, computer replay system 101 and the one or more data sources (e.g., 190-191) can be and/or operate on different devices, as shown in FIG. 1.

In several embodiments, computer replay system 101 can include one or more processors, such as processor 109. In a number of embodiments, computer replay system 101 can include a storage component 110, which can include a transactional database 111 and/or a historical database 112. In some embodiments, computer replay system 101 can include an operating system 128. In various embodiments, computer replay system 101 can include one or more modules, such as a transaction reception module 120, a transaction data module 121, a historical data module 122, a user communications module 123, a rewind module 124, a replay module 125, a data communications module 126, a filter module 127, and/or a composite records module 128. In many embodiments, the modules (e.g., 120-128) can be configured to run on processor 109.

In some embodiments, transaction reception module 120 can be configured to receive transactions from the data sources (e.g., 190-191). In several embodiments, transactional data module 121 can be configured to store the transactions in transactional database 111. In a number of embodiments, historical data module 122 can be configured to update a current state of one or more first records in historical database 112 based on the transactions. In various embodiments, user communications module 123 can be configured to receive requests from the one or more users (e.g., 180-181) for a replay of the data. In many embodiments, rewind module 124 can be configured to determine a state of the one or more records in historical database 112 at any moment in time. In several embodiments, replay module 125 can be configured to determine and retrieve transactions in transactional database 111 for the replay. In a number of embodiments, a data communications module 126 can be configured to provide the state of the records at the any moment to the one or more users (e.g., 180-181), to provide sequentially the transactions from transactional database 111 that occurred after the moment in time to the one or more users (e.g., 180-181), and/or to provide transactions received by transactional reception module 120 in substantially real time to the one or more users (e.g., 180-181). In some embodiments, filter module 127 can be configured to filter the transactions to include certain records. In several embodiments, composite records module 128 can be configured to create two or more composite records in historical database 112 for two or more time periods based on the transactions.

In some embodiments, historical database 112 can be a database or collection of records used to store the state and/or status of the one or more data records at one or more predetermined intervals. In some examples, historical database 112 can be organized to store the status of the one or more records when any of the one or more records are added, removed, or updated by a transaction. In other examples, historical database 112 can be organized to store the status of the one or more records at predetermined intervals, such as every second, every minute, every hour, every 10 transactions, every 1,000 transactions, etc.

In some examples, transactional database 111 can be a database or collection of records used to record transactions received by transaction reception module 120. In many embodiments, transactional database 111 can store every transaction received by transaction reception module 120. A transaction can be a creation, update, deletion, or other change of one or more records. In some examples, a transaction can include the return of a null or empty value. In the same or different embodiment, a transaction can include the return of nothing, such as an initial query if the requested record or database does not exist and/or has a null value.

In some examples, the databases (e.g., transactional database 111 and/or historical database 112) can be a structured collection of records or data. For example, the databases stored in storage component 110 can be an XML (Extensible Markup Language) database, MySQL, or an Oracle® database. In the same or different embodiments, the databases can include searchable groups of individual data files stored in storage component 110 or information stored in memory.

In some examples, storage component 110 can be a distributed storage mechanism that can store data across multiple storage devices and/or platforms. In several examples, the records in transactional database 111 and/or historical database 112 can be stored on different storage devices and/or platforms. For example, the data can be stored on various storage devices based on access patterns or age of the data (e.g., older or less used data can be stored on slower storage devices).

In many embodiments, computer replay system 101 can be a single computer, a single server, or a cluster or collection of computers or servers, or a cloud of computers or servers. Typically, a cluster or collection of servers can be used when the demands by client computers (e.g., user 180, user 181, data source 190, and/or data source 191) are beyond the reasonable capability of a single server or computer. In many embodiments, the servers in the cluster or collection of servers can be interchangeable from the perspective of the client computers. In some embodiments, computer replay system 101 can be a stand-alone system. For example, a single server can include transaction reception module 120, transactional data module 121, historical data module 122, user communications module 123, rewind module 124, a replay module 125, data communications module 126, filter module 127, and composite records module 128. In other embodiments, computer replay system can be part of a larger system, such as one or more modules of a larger system. In some examples, a first server can include a first portion of the modules (e.g., 120-128) and one or more second servers can include a second portion of these modules (e.g., 120-128), which in some embodiments can overlap with the first portion of the modules. In these examples, computer replay system 101 can include the combination of the first server and the one or more second servers.

In various embodiments, operating system 129 can be a software program that manages the hardware and software resources of a computer and/or a computer network. In some embodiments, operating system 129 can perform basic tasks such as, for example, controlling and allocating memory, prioritizing the processing of instructions, controlling input and output devices, facilitating networking, and managing files. Examples of common operating systems for a computer include Microsoft® Windows, Mac® operating system (OS), UNIX® OS, and Linux® OS.

In several embodiments, processor 109 can be any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. For example, processor 109 can be similar or identical to CPU 810 (FIG. 8), described below.

In some embodiments, historical database 112 can store updates to records (such as all updates, including creations, modifications, and deletions) versioned per record by time. In several embodiments, transactional database 111 can store all the transactions received. In several embodiments, the one or more users (e.g., 180-181) can request a historical query and subscribe operation from computer replay system 101 starting at a specific moment. In many embodiments, computer replay system 101 can executes the historical query by scanning the historical database for the state of all records at the moment specified and returning the results to the user. In a number of embodiments, after the query is completed, computer replay system 101 can use transactional database 111 to perform the subscribe operation by replaying to the one or more users (e.g., 180-181) the updates that occurred after the specified moment. In several embodiments, after computer replay system 101 has replayed all the transactions stored in transactional database 111, any new transactions received by the system can be sent to the one or more users (e.g., 180-181) as the transactions are received by computer replay system 101.

In many embodiments, computer replay system 101 can be used in various areas and fields. For example, a retail company can use computer replay system 101 to track inventory of one or more items, such as by investigating the historical sales of a group of products. In one example, computer replay system 101 can be used to allow the retail company to pick a specific moment in time and replay the sales of a group of products after that specific moment. The retail company could analyze these historical records to better understand historical sales patterns and predict future sales and inventory needs.

In another example, an investor could use computer replay system 101 to analyze one or more investments. In still another example, a company could use computer replay system 101 to determine a cause of a software or hardware failure. In this example, a piece of software or hardware could have failed at a specific moment and computer replay system 101 can be used to replay the transactions into the software or hardware before the failure to help determine the cause of the failure. In some embodiments, computer replay system 101 can be used to restore the software and/or hardware to the current state after a failure. In yet a further example, banks or financial institutions can use computer replay system 101 to store and recreate financial records, such as may be required by various laws. In yet another example, a market trading algorithm can use computer replay system 101, such by using the historical query and subscribe option of computer replay system 101, to back-test algorithms against historical market data to determine profitability and predict expected success.

In a further example, a taxicab company can store real-time GPS (Global Positioning System) locations of all their taxicabs to computer replay system 101 and there can be an event of interest at some moment in time (e.g., a cell phone or a purse left in taxicab). The data available from the taxicab customer to track down the cab driver can be limited to the approximate pickup and drop-off location and time. If the taxicab company is provided with this information, the taxicab company can query the then-current location of all taxicabs at approximately the specified pickup time from computer replay system 101 and then use the replay functionality to plot the paths of all taxicabs to see which taxicabs end up at the drop-off location at approximately the specified drop-off time.

In some embodiments, computer replay system 101 can be used to replay geolocation data stored as GPS coordinates for a fleet of taxis to replay paths, analyze traffic route efficiency, and/or recommend routes based on historical pickup and/or delivery locations and/or times. In various embodiments, computer replay system 101 can be similarly used to replay geolocation data stored as GPS coordinates for airlines to analyze plane routes or otherwise train and/or test air traffic control systems.

Existing methods and systems for replaying historical data generally lack the ease of use and speed of computer replay system 101, as described herein. Using computer replay system 101, in several embodiments, a user can quickly (and almost instantaneously) rewind the data to any moment in time and subsequently replay the transactions that occurred after the specified moment. Using conventional systems, even if it were possible for the taxicab company to recreate the paths of the various taxicabs by parsing together stored data, it can be too costly and too slow for the taxicab company to offer these services to its customers. In many embodiments, a taxicab company can use computer replay system 101 to determine the cab and provide this information to the customer quickly, such as over the telephone. In various embodiments, computer replay system 101 can combine both the historical query and subscribe functions in a single system, which can beneficially allow for ease-of-use not offered when those functions are serviced by disparate systems, as computer replay system 101 can advantageously eliminate the need to reconcile two or more streams of data.

Figure 2:
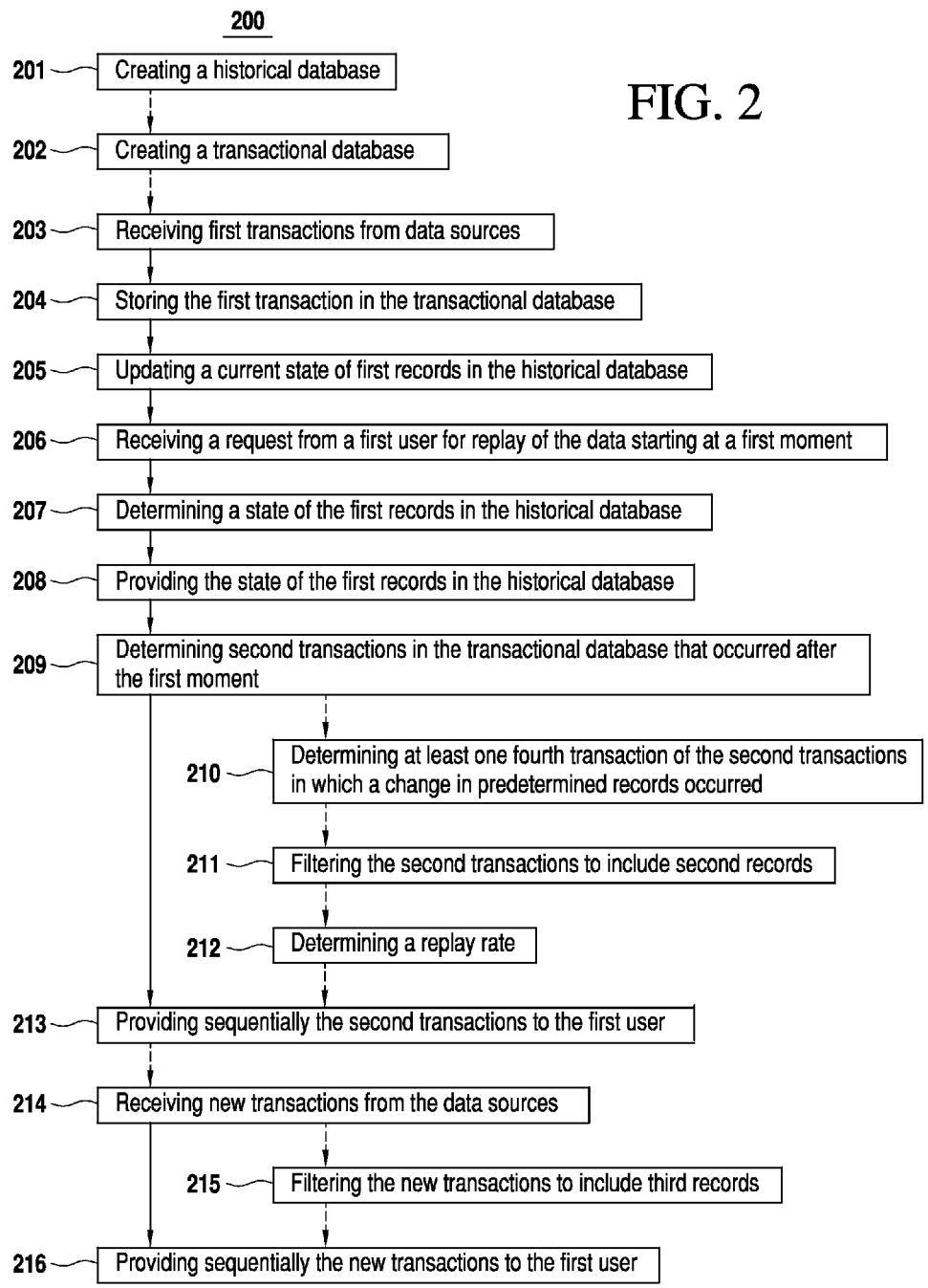
FIG. 2 illustrates a flow chart for an exemplary method of providing a snapshot of data at a specific moment and replaying at least a part of the data to a user using a computer replay system, according to another embodiment.
Figure 3:
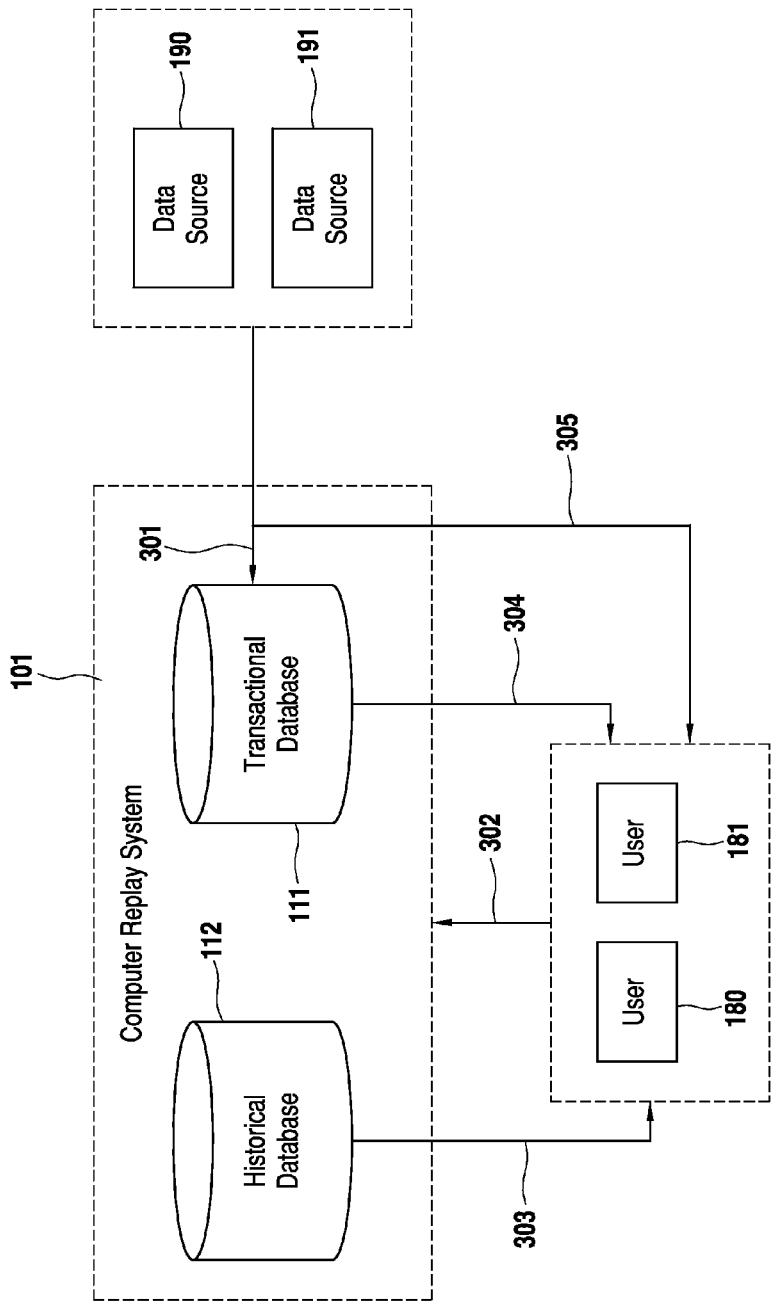
FIG. 3 illustrates an exemplary diagram of the movement of data between the one or more data sources, the one or more users, and the components of the computer replay system of FIG. 1.

FIG. 2 illustrates a flow chart for an exemplary method 200 of providing a snapshot of data at a specific moment and replaying at least a part of the data to a user using a computer replay system. FIG. 3 illustrates an exemplary diagram of the movement of data between the one or more data sources (e.g., 190-191), the one or more users (e.g., 180-181), and the components of computer replay system 101. Method 200 is merely exemplary and is not limited to the embodiments presented herein. Method 200 can be employed in many different embodiments or examples not specifically depicted or described herein. In some embodiments, the activities, the procedures, and/or the processes of method 200 can be performed in the order presented. In other embodiments, the activities, the procedures, and/or the processes of method 200 can be performed in any other suitable order. In still other embodiments, one or more of the activities, the procedures, and/or the processes in method 200 can be combined or skipped. The computer replay system can be similar or identical to computer replay system 101 (FIG. 1, 3). The user can be similar or identical to the one or more users (e.g., 180-181 (FIG. 1, 3).

Referring to FIG. 2, in some embodiments, method 200 can optionally include a block 201 of creating a historical database. In some examples, block 201 of creating the historical database can include creating a database or a structured collection of records that can be organized to store the state of the one or more records of one or more transactions at one or more predetermined intervals. In many embodiments, the historical database can be identical or similar to historical database 112 (FIGS. 1, 3).

In a number of embodiments, method 200 can optionally include a block 202 of creating a transactional database. In some examples, block 202 of creating the transactional database can include creating a database or a structured collection of records that can be organized to record transactions received by a transaction reception module, such as transaction reception module 121 (FIG. 1). In some examples, the transactional database can be identical or similar to transactional database 111 (FIG. 1, 3).

In several embodiments, method 200 can include a block 203 of receiving one or more first transactions at the computer replay system from one or more data sources. In some examples, transaction reception module 120 (FIG. 1) can receive the one or more transactions from the one or more data sources (e.g., 190 and/or 191 (FIGS. 1, 3)).

In a number of embodiments, method 200 also can include a block 204 of storing the one or more first transactions in the transactional database. In some examples, transaction reception module 120 (FIG. 1) can communicate the transactions to transactional data module 121 (FIG. 1), and transactional data module 121 can store the transactions in transactional database 111 (FIG. 1). For example, as shown in FIG. 3, a transaction can be received at transactional database 111 from the one or more data sources (e.g., 190-191) in an activity 301.

In several embodiments, block 204 of FIG. 2 can include filtering the first transactions before storing the first transaction in the transactional database. For example, as part of block 204, the computer replay system 101 (FIGS. 1, 3) can be configured to select a subset of incoming data for storage and replay. In one example, a user may have a data source (e.g., 190, 191) providing order data and pricing data, but transactional data module 121 (FIG. 1) can store only order data and can filter out the pricing data.

Figure 6:
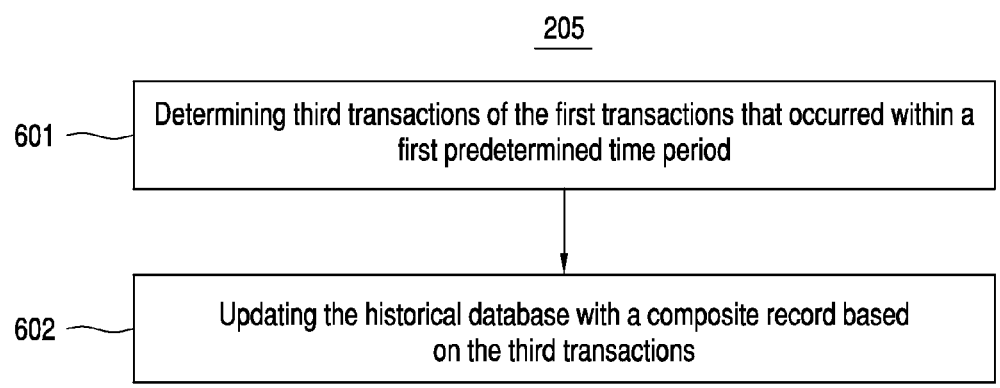
FIG. 6 illustrates a flow chart for an exemplary procedure of updating the current state of the one or more first records in the historical database; according to the embodiment of FIG. 2.

In a number of embodiments, method 200 additionally can include a block 205 of updating a current state of one or more first records in the historical database based on the first transactions. In a number of embodiments, block 205 can be performed as shown in FIG. 6, described below. In some examples, historical data module 122 (FIG. 1) can receive the transactions from transactional reception module 120. Historical data module 122 (FIG. 1) can update historical database 112 (FIG. 1).

Figure 4:
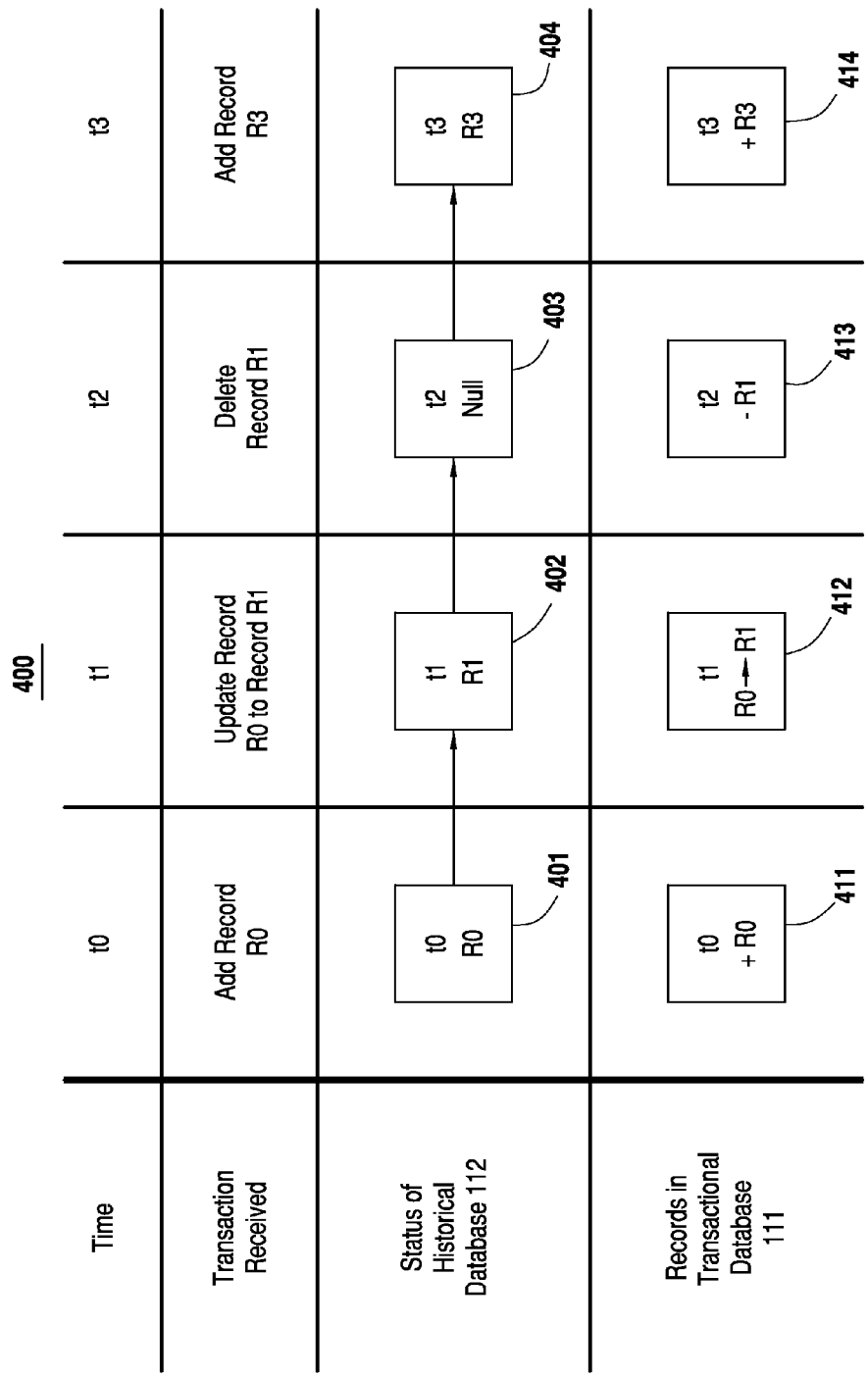
FIG. 4 illustrates an exemplary timeline of the status of an exemplary set of records in the historical database and the transactional database of FIG. 1.

For example, FIG. 4 illustrates an exemplary timeline 400 of the status of an exemplary set of records in historical database 112 (FIGS. 1, 3) and transactional database 111 (FIGS. 1, 3). Referring to FIG. 4, at a moment in time, t0, transaction reception module 120 (FIG. 1) can receive a first transaction that adds a record R0. In several embodiments, transactional data module 121 (FIG. 1) can add a record 411 of the first transaction sequentially to transactional database 111 (FIGS. 1, 3). In several embodiments, historical data module 122 (FIG. 1) can update a status 401 of the records at moment t0 in historical database 112 (FIGS. 1, 3). For example, status 401 of the records at t0 can be that a record R0 exists.

Next, in the example shown in FIG. 4, at a later moment in time, t1, transaction reception module 120 (FIG. 1) can receive a second transaction that updates record R0 to a record R1. In many embodiments, transactional data module 121 (FIGS. 1, 3) can add a record 412 of the second transaction sequentially to transactional database 111 (FIG. 1). In several embodiments, historical data module 122 (FIG. 1) can update a status 402 of the records at moment t1 in historical database 112 (FIGS. 1, 3). For example, status 402 of the records at moment t1 can be that a record R1 exists.

The example shown in FIG. 4 can continue with, at a subsequent moment in time, t2, transaction reception module 120 (FIG. 1) receiving a third transaction that deletes record R1. In some embodiments, transactional data module 121 (FIG. 1) can add a record 413 of the third transaction sequentially to transactional database 111 (FIGS. 1, 3). In various embodiments, historical data module 122 (FIG. 1) can update a status 403 of the records at moment t2 in historical database 112 (FIGS. 1, 3). For examples, status 403 of the records at moment t2 can be that no records exist ("null").

Subsequently, in the example shown in FIG. 4, at an even later moment in time, t3, transaction reception module 120 (FIG. 1) can receive a fourth transaction that adds a record R3. In several embodiments, transactional data module 121 (FIG. 1) can add a record 414 of the fourth transaction sequentially to transactional database 111 (FIGS. 1, 3). In a number of embodiments, historical data module 122 (FIG. 1) can update a status 404 of the records at moment t3 in historical database 112 (FIGS. 1, 3). For example, status 404 of the records at moment t3 can be that a record R3 exists.

In the same or different examples, updating the current state of the records can include historical data module 122 (FIG. 1) determining a period of time in which two or more transactions occurred. After determining the period when the two or more transactions occurred, composite records module 128 (FIG. 1) can create a composite record based on the two or more transaction, and historical data module 122 (FIG. 1) can update historical database 112 (FIGS. 1, 3) with the composite record. A composite record can be a record configured to store the status of the records based on one or more transactions at predetermined intervals (e.g., one minute, two hours, every 10 transactions, every 1,000 transactions, etc.).

Figure 5:
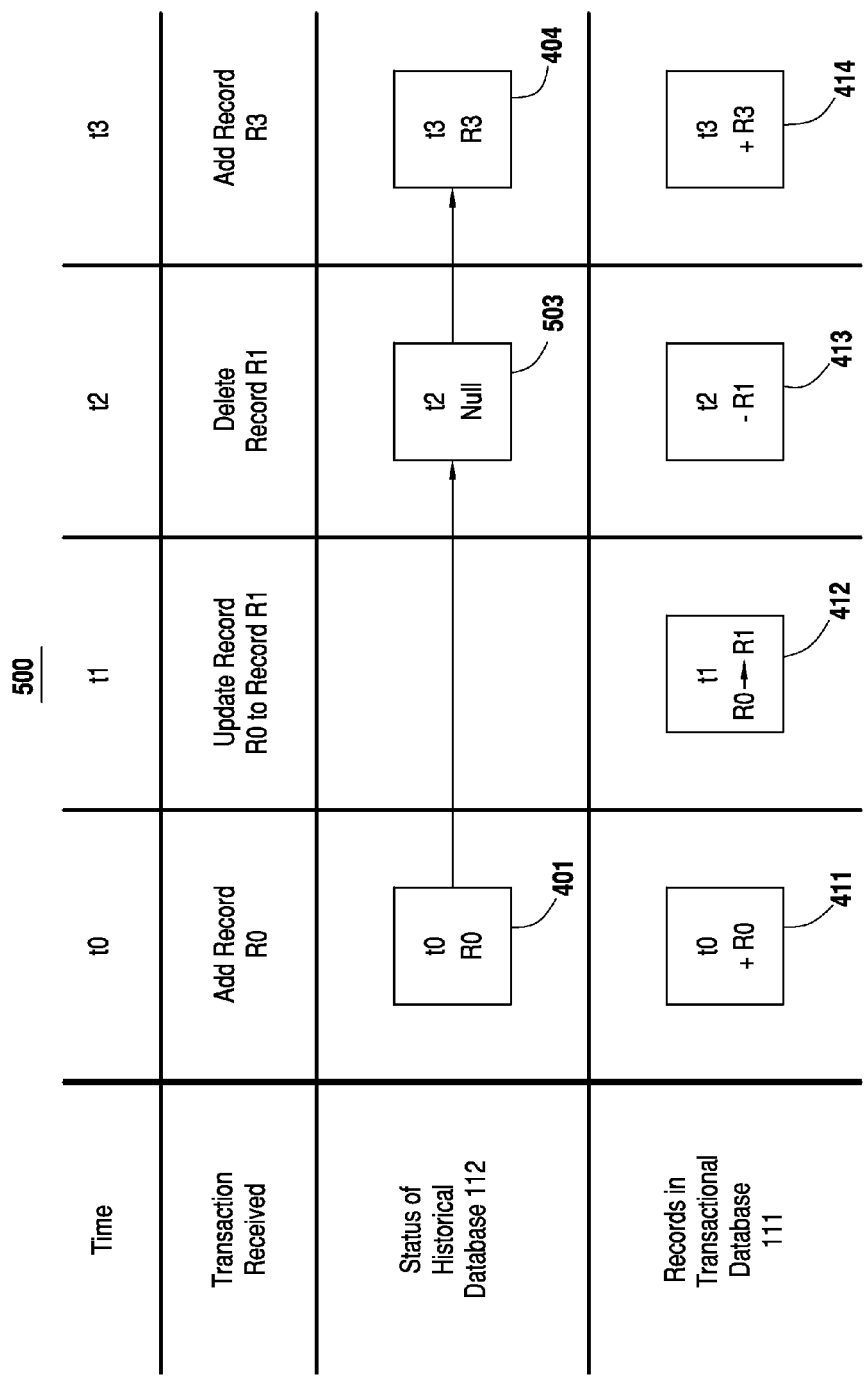
FIG. 5 illustrates a second exemplary timeline of the status of an exemplary set of records in the historical database and the transactional database of FIG. 1.

For example, FIG. 5 illustrates an exemplary timeline 500 of the status of an exemplary set of records in historical database 112 (FIGS. 1, 3) and transactional database 111 (FIGS. 1, 3). Timeline 500 can be similar to timeline 400 (FIG. 4), and various elements of timeline 500 can be similar or identical to one or more elements of timeline 400 (FIG. 4). Referring to FIG. 5, if computer replay system 101 (FIG. 1) was configured to save the status of the records at one-hour internals and moments t1 and t2 occurred in the hour after moment t0, and moment t4 occurred more than an hour after moment t0, composite records module 128 (FIG. 1) can combine the second and third transaction into a single composite record, and historical data module 122 (FIG. 1) can store a status 503 of the records at moment t2 in historical database 112 (FIGS. 1, 3), such that historical data module 122 can store status 401 at moment t0, status 503 at moment t2, and status 404 at moment t4. For example, status 503 of the records at moment t2 can be that no records exist ("null"). In many embodiments, although composite records module 128 (FIG. 1) can combine the second and third transactions into a single composite record, which can be stored in status 503, transaction data module 121 (FIG. 1) can still store all four records (e.g., 411-414) of the four transactions individually in transactional database 111 (FIG. 1).

Referring back to FIG. 2, in many embodiments, method 200 further can include a block 206 of receiving a request from a first user for a replay of the data starting at a first moment. In some examples, user communications module 123 (FIG. 1) can receive the request from the first user, which can be one of the one or more users (e.g., 180-181 (FIGS. 1, 3)). In a number of embodiments, in the request the first user can request a replay of transactions starting at a first moment (e.g., moment t1 in FIGS. 4-5). For example, as shown in FIG. 3, the one or more users (e.g., 180-181) can send a request to computer replay system 101 in an activity 302 to replay the data starting at a specified time.

In a number of embodiments, method 200 additionally can include a block 207 of determining a state of the one or more first records in the historical database at the specified moment. In some examples, rewind module 124 (FIG. 1) can retrieve the status of records at the specified moment from historical database 112 (FIG. 1).

In several embodiments, method 200 further can include a block 208 of providing the state of the one or more first records at the first moment to the first user. In some examples, data communications module 126 (FIG. 1) can provide the state of the records at the specified moment to user 180 (FIGS. 1, 3) and/or 181 (FIGS. 1, 3). For example, as shown in FIG. 3, computer replay system 101 can provide in an activity 303 a status (e.g., status 401 (FIGS. 4-5), status 402 (FIG. 4), status 403 (FIG. 4), status 404 (FIGS. 4-5), and/or status 503 (FIG. 5)) of the records from historical database 112 to the one or more users (e.g., 180-181).

In a number of embodiments, method 200 additionally can include a block 209 of determining one or more second transactions in transactional database (FIG. 1, 3) that occurred after the first moment. In some examples, replay module 125 (FIG. 1) can determine one or more transactions that occurred after the specified moment. For example, referring again to FIG. 4, if a query is received for all records between moments t1 and t2, rewind module 124 (FIG. 1) can communicate status 402 for moment t1 (i.e., record R1 exists), as stored in historical database 112 (FIGS. 1, 3) to data communications module 126. Furthermore, replay module 125 (FIG. 1) can sequentially communicate the third transaction (as stored in record 413 in transactional database 111 (FIGS. 1, 3)) and the fourth transaction (as stored in record 414 in transactional database 111 (FIGS. 1, 3)) to data communications module 126 (FIG. 1).

In several embodiments, if a query is received for all records starting at a moment before moment t0, rewind module 124 (FIG. 1) will not communicate the status of any records in historical database 112 (FIGS. 1, 3) to data communications module 126. In this example, replay module 125 (FIG. 1) can sequentially communicate the first through fourth transactions (as stored in records 411-414 in transactional database 111 (FIGS. 1, 3)) to data communications module 126 (FIG. 1). In some examples, sequentially communicating can refer to providing the transactions in the time order that the transaction occurred. In the same or different example, sequentially communicating can occur by providing each transaction individually or by bundling or grouping a set of transactions together and communicating the bundle or group of transactions together.

In many embodiments, method 200 can include one or more optional steps before performing block 213, described below. For example, in some embodiments, method 200 optionally can include a block 210 of determining at least one fourth transaction of the one or more second transactions in the transactional database in which a change in one or more predetermined records occurred. In a number of embodiments, block 210 can be performed after block 209 of determining the one or more second transactions in the transactional database that occurred after the first moment. For example, computer replay system 101 can determine when changes occurred to records (e.g., R0, R1, R3 in FIGS. 4-5) as a result of a transaction (e.g., as recorded in records 411-414 (FIGS. 4-5)).

In several embodiments, method 200 optionally can include a block 211 of filtering the one or more second transactions to include one or more second records. In several embodiments, block 211 can be performed before block 213, described below. In various examples, filter module 127 (FIG. 1) can filter the one or more second records before the records are provided to user 180 (FIGS. 1, 3) and/or 181 (FIGS. 1, 3). In some examples, filter module 127 (FIG. 1) can filter the status of records retrieved by rewind module 124 (FIG. 1) along with the transactions retrieved by replay module 125 (FIG. 1) before the data is provided to user 180 (FIGS. 1, 3) and/or 181 (FIGS. 1, 3). For example, the databases (e.g., 111, 112) can include statuses and/or records with respect to records X0 and X1, but user 180 (FIGS. 1, 3) and/or 181 (FIGS. 1, 3) can in an example only request replay of record X0. In this example, filter module 127 (FIG. 1) can filter out record X1 before communicating with user 180 (FIGS. 1, 3) and/or 181 (FIGS. 1, 3).

In some embodiments, method 200 optionally can include a block 212 of determining a replay rate for providing the one or more second transactions to the first user. In a number of embodiments, data communications module 126 (FIG. 1) can determine a replay rate to provide the data to user 180 (FIGS. 1, 3) and/or 181 (FIGS. 1, 3). In many examples, the replay rate can be faster (e.g., two times, five times, or 1,000 times faster) than a receiving rate at which transaction reception module 120 (FIG. 1) received the transactions. In other embodiments, the replay rate can be slower than the receiving rate. In certain embodiments, user 180 (FIGS. 1, 3) and/or 181 (FIGS. 1, 3) can provide the replay rate to user communications module 123 (FIG. 1).

In a number of embodiments, method 200 further can include a block 213 of providing sequentially the one or more second transactions from the transactional database that occurred after the first moment to the first user. In some examples data communications module 126 (FIG. 1) can communicate the one or more transactions that occurred after the specified moment to user 180 (FIGS. 1, 3) and/or 181 (FIGS. 1, 3). In many embodiments, the transactions can be provided sequentially to user 180 (FIGS. 1, 3) and/or 181 (FIGS. 1, 3). For example, as shown in FIG. 3, computer replay system 101 can, in an activity 304, provide the transactions from transaction database 111 to the one or more users (e.g., 180-181). Returning to FIG. 2, in many embodiments, block 213 can include data communications module 126 (FIG. 1) providing sequentially at the replay rate (determined in block 212) the one or more second transactions from transaction database 111 to user 180 (FIGS. 1, 3) and/or 181 (FIGS. 1, 3). In several embodiments, block 213 can include providing sequentially the one or more second records (filtered in block 211) of the one or more second transactions from the transaction database to the first user.

In some embodiments, method 200 optionally can include a block 214 of receiving one or more new transactions at the computer replay system from the one or more data sources. In some embodiments, block 214 can be performed at block 203. In various embodiments, after the replay has begun (or finished), transaction reception module 120 (FIG. 1) can receive additional transactions. In some embodiments, after the one or more new transactions are received, one or more of blocks 204-214 can be repeated one or more additional times.

In several embodiments, method 200 optionally can include a block 215 of filtering the one or more new transactions to include one or more third records. In several embodiments, block 215 can be performed before block 216, described below. In various examples, filter module 127 (FIG. 1) can filter the one or more third records before the records are provided to user 180 (FIGS. 1, 3) and/or 181 (FIGS. 1, 3). In some examples, filter module 127 (FIG. 1) can filter the status of records retrieved by rewind module 124 (FIG. 1) along with the transactions retrieved by replay module 125 (FIG. 1) before the data is provided to user 180 (FIGS. 1, 3) and/or 181 (FIGS. 1, 3), as described above with respect to block 211.

In various embodiments, block 216 further can include a block 216 of providing sequentially the one or more new transactions to the first user. In many embodiments, block 216 can be performed after block 213. In several embodiments, after the new transactions are received by transaction reception module 120 (FIG. 1), transaction reception module 120 (FIG. 1) can communicate sequentially the new transaction to data communications module 126 (FIG. 1), which can be via filter module 127 (FIG. 1), in some examples. In many embodiments, data communications module (FIG. 1) 126 can communicate the new transactions to users 180 (FIG. 1) and/or 181 (FIG. 1) after data communications module 126 (FIG. 1) has finished communicating the historical transactions from transactional database 111 (FIG. 1) to users 180 (FIGS. 1, 3) and/or 181 (FIGS. 1, 3). In some examples, the new transactions can be provided to the first user in substantially real time before any storage of the one or more new transactions. For example, as shown in FIG. 3, computer replay system 101 can, in an activity 305, provide the new transactions from the one or more data sources (e.g., 190-191) to the one or more users (e.g., 180-181) before storing the new transactions in transaction database 111. Referring again to FIG. 2, in several embodiments, block 216 can include providing sequentially the one or more third records (filtered in block 215) of the one or more new transactions from the transaction database to the first user.

Turning ahead in the drawings, FIG. 6 illustrates a flow chart for block 205 of updating the current state of the one or more first records in the historical database. Block 205 is merely exemplary and is not limited to the embodiments presented herein. Block 205 can be employed in many different embodiments or examples not specifically depicted or described herein. In some embodiments, the activities, the procedures, and/or the processes of block 205 can be performed in the order presented. In other embodiments, the activities, the procedures, and/or the processes of block 205 can be performed in any other suitable order. In still other embodiments, one or more of the activities, the procedures, and/or the processes in block 205 can be combined or skipped.

Referring to FIG. 6, in some embodiments, block 205 can include a block 601 of determining one or more third transactions of the one or more first transactions that occurred within a first predetermined time period. For example, historical data module 122 (FIG. 1) can determine a period of time in which two or more transactions occurred.

In a number of embodiments, block 205 also can include a block 602 of updating the historical database with a composite record based on the one or more third transactions. For example, after determining the period when the two or more transactions occurred, composite records module 128 (FIG. 1) can create a composite record based on the two or more transaction, and historical data module 122 (FIG. 1) can update historical database 112 (FIGS. 1, 3) with the composite record, as described above and shown in status 503 of FIG. 5.

Figure 7:
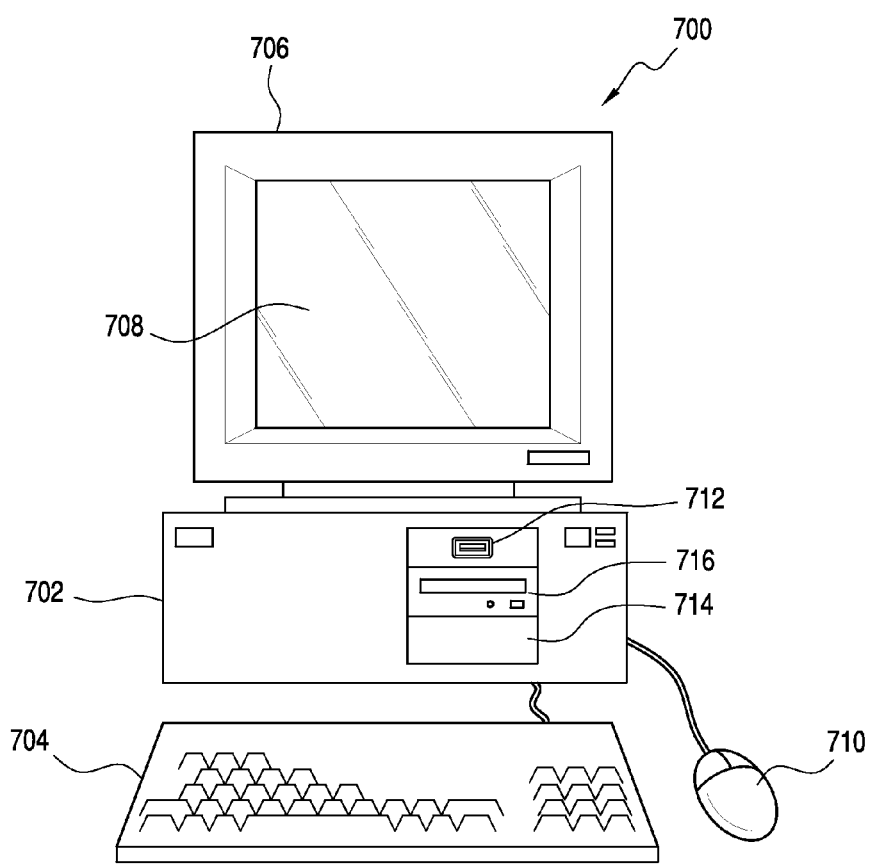
FIG. 7 illustrates a computer system that is suitable for implementing an embodiment of at least a portion of the computer replay system of FIG. 1.
Figure 8:
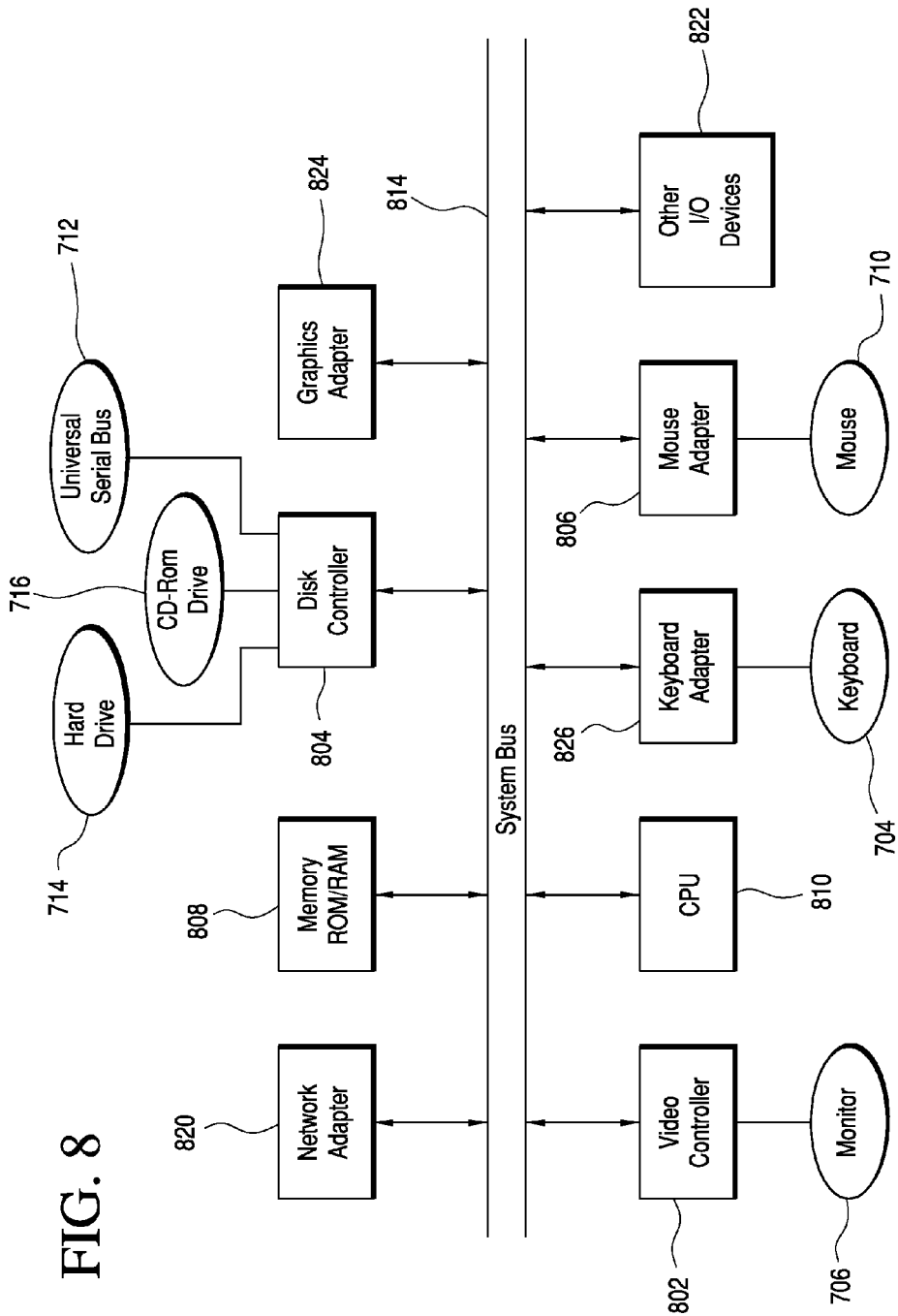
FIG. 8 illustrates a representative block diagram of an example of elements included in circuit boards inside a chassis of the computer of FIG. 7.

Turning ahead in the drawings, FIG. 7 illustrates a computer system 700, all of which or a portion of which can be suitable for implementing an embodiment of at least a portion of computer replay system 101 (FIG. 1). Computer system 700 includes a chassis 702 containing one or more circuit boards (not shown), a USB (universal serial bus) port 712, a Compact Disc Read-Only Memory (CD-ROM) and/or Digital Video Disc (DVD) drive 716, and a hard drive 714. A representative block diagram of the elements included on the circuit boards inside chassis 702 is shown in FIG. 8. A central processing unit (CPU) 810 in FIG. 8 is coupled to a system bus 814 in FIG. 8. In various embodiments, the architecture of CPU 810 can be compliant with any of a variety of commercially distributed architecture families.

Continuing with FIG. 8, system bus 814 also is coupled to memory 808 that includes both read only memory (ROM) and random access memory (RAM). Non-volatile portions of memory storage unit 808 or the ROM can be encoded with a boot code sequence suitable for restoring computer system 700 (FIG. 7) to a functional state after a system reset. In addition, memory 808 can include microcode such as a Basic Input-Output System (BIOS). In some examples, the one or more memory storage units of the various embodiments disclosed herein can comprise memory storage unit 808, a USB-equipped electronic device, such as, an external memory storage unit (not shown) coupled to universal serial bus (USB) port 712 (FIGS. 7-8), hard drive 714 (FIGS. 7-8), and/or CD-ROM or DVD drive 716 (FIGS. 7-8). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 810.

In the depicted embodiment of FIG. 8, various I/O devices such as a disk controller 804, a graphics adapter 824, a video controller 802, a keyboard adapter 826, a mouse adapter 806, a network adapter 820, and other I/O devices 822 can be coupled to system bus 814. Keyboard adapter 826 and mouse adapter 806 are coupled to a keyboard 604 (FIGS. 7 and 8) and a mouse 710 (FIGS. 7 and 8), respectively, of computer system 700 (FIG. 7). While graphics adapter 824 and video controller 802 are indicated as distinct units in FIG. 8, video controller 802 can be integrated into graphics adapter 824, or vice versa in other embodiments. Video controller 802 is suitable for refreshing a monitor 706 (FIGS. 7 and 8) to display images on a screen 708 (FIG. 7) of computer system 700 (FIG. 7). Disk controller 804 can control hard drive 714 (FIGS. 7 and 8), USB port 712 (FIGS. 7 and 8), and CD-ROM or DVD drive 716 (FIGS. 7 and 8). In other embodiments, distinct units can be used to control each of these devices separately.

In some embodiments, network adapter 820 can comprise and/or be implemented as a WNIC (wireless network interface controller) card (not shown) plugged or coupled to an expansion port (not shown) in computer system 700 (FIG. 7). In other embodiments, the WNIC card can be a wireless network card built into computer system 700 (FIG. 7). A wireless network adapter can be built into computer system 700 (FIG. 7) by having wireless communication capabilities integrated into the motherboard chipset (not shown), or implemented via one or more dedicated wireless communication chips (not shown), connected through a PCI (peripheral component interconnector) or a PCI express bus of computer system 700 (FIG. 7) or USB port 712 (FIG. 7). In other embodiments, network adapter 820 can comprise and/or be implemented as a wired network interface controller card (not shown).

Although many other components of computer system 700 (FIG. 7) are not shown, such components and their interconnection are well known to those of ordinary skill in the art. Accordingly, further details concerning the construction and composition of computer system 700 (FIG. 7) and the circuit boards inside chassis 702 (FIG. 7) need not be discussed herein.

When computer system 700 in FIG. 7 is running, program instructions stored on a USB drive in USB port 712, on a CD-ROM or DVD in CD-ROM and/or DVD drive 716, on hard drive 714, or in memory 808 (FIG. 8) are executed by CPU 810 (FIG. 8). A portion of the program instructions, stored on these devices, can be suitable for carrying out all or at least part of the techniques described herein.

Although computer system 700 is illustrated as a desktop computer in FIG. 7, there can be examples where computer system 700 may take a different form factor while still having functional elements similar to those described for computer system 700. In some embodiments, computer system 700 may comprise a single computer, a single server, or a cluster or collection of computers or servers, or a cloud of computers or servers. Typically, a cluster or collection of servers can be used when the demand on computer system 700 exceeds the reasonable capability of a single server or computer. In certain embodiments, computer system 700 may comprise a portable computer, such as a laptop computer. In certain other embodiments, computer system 700 may comprise a mobile device, such as a smartphone. In certain additional embodiments, computer system 700 may comprise an embedded system.

Although the disclosure has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 2 and 6 may include different procedures, processes, and/or activities and be performed by many different modules, in many different orders, and/or one or more of the procedures, processes, or activities of FIGS. 2 and 6 may include one or more of the procedures, processes, or activities of another different one of FIGS. 2 and 6.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of providing a snapshot of data at a specific moment and replaying at least part of the data to a user using a computer replay system, the method comprising:
    receiving one or more first transactions at the computer replay system through a network from one or more data sources that operate on one or more devices that are different from the computer replay system, the computer replay system comprising one or more processors, a transactional database, and a historical database;
    storing the one or more first transactions in the transactional database, the one or more first transactions each being at least one of a creation, a change, or a deletion of one or more first records in the historical database;
    updating a current state of the one or more first records in the historical database based on the one or more first transactions;
    receiving a request from a first user for a replay of the data starting at a first moment;
    determining a state of the one or more first records in the historical database at the first moment;
    providing the state of the one or more first records at the first moment to the first user;
    determining one or more second transactions in the transactional database that occurred after the first moment; and
    providing sequentially the one or more second transactions to the first user.

2. The method of claim 1, further comprising:
    before providing sequentially the one or more second transactions to the first user, filtering the one or more second transactions to include one or more second records,
    wherein:
        providing sequentially the one or more second transactions to the first user comprises:
            providing sequentially the one or more second records of the one or more second transactions from the transactional database to the first user.

3. The method of claim 1, further comprising:
    after receiving the one or more first transactions at the computer replay system from the one or more data sources, receiving one or more new transactions at the computer replay system from the one or more data sources; and
    after providing sequentially the one or more second transactions to the first user, providing sequentially the one or more new transactions to the first user.

4. The method of claim 3, further comprising:
    before providing sequentially the one or more new transactions to the first user, filtering the one or more new transactions to include one or more third records,
    wherein:
        providing sequentially the one or more new transactions to the first user comprises:
            providing sequentially the one or more third records of the one or more new transactions to the first user.

5. The method of claim 3, wherein:
    the one or more new transactions are provided to the first user in real time before any storage of the one or more new transactions.

6. The method of claim 1, wherein:
    updating the current state of the one or more first records in the historical database comprises:
        determining one or more third transactions of the one or more first transactions that occurred within a first predetermined time period; and
        updating the historical database with a composite record based on the one or more third transactions.

7. The method of claim 1, further comprising:
    after determining the one or more second transactions in the transactional database that occurred after the first moment, determining at least one fourth transaction of the one or more second transactions in the transactional database in which a change in one or more predetermined records occurred.

8. The method of claim 1, further comprising:
    determining a replay rate for providing the one or more second transactions to the first user,
    wherein:
        providing sequentially the one or more second transactions to the first user comprises:
            providing sequentially at the replay rate the one or more second transactions from the transactional database to the first user.

9. The method of claim 8, wherein:
    the replay rate is faster or slower than a receiving rate at which the computer replay system received the one or more first transactions.

10. The method of claim 1, further comprising, before receiving the one or more first transactions at the computer replay system from the one or more data sources:
    creating the historical database; and
    creating the transactional database.

11. A computer replay system configured to provide a snapshot of data at a specific moment and replaying a subsequent part of the data to one or more users, the computer replay system comprising:
    one or more processors;
    a transactional database;
    a historical database; and
    one or more non-transitory memory storage modules storing computing instructions configured to run on the one or more processors and perform acts of:

receiving one or more first transactions at the computer replay system through a network from one or more data sources that operate on one or more devices that are different from the computer replay system;

storing the one or more first transactions in the transactional database, the one or more first transactions each being at least one of a creation, a change, or a deletion of one or more first records in the historical database;

updating a current state of the one or more first records in the historical database based on the one or more first transactions;

receiving a request from a first user for a replay of the data starting at a first moment;

determining a state of the one or more first records in the historical database at the first moment;

providing the state of the one or more first records at the first moment to the first user;

determining one or more second transactions in the transactional database that occurred after the first moment; and providing sequentially the one or more second transactions to the first user.

12. The computer replay system of claim 11, wherein the computing instructions are further configured to perform an act of:

before providing sequentially the one or more second transactions to the first user, filtering the one or more second transactions to include one or more second records, wherein:

providing sequentially the one or more second transactions to the first user comprises:

providing sequentially the one or more second records of the one or more second transactions from the transactional database to the first user.

13. The computer replay system of claim 11, wherein the computing instructions are further configured to perform acts of:

after receiving the one or more first transactions at the computer replay system from the one or more data sources, receiving one or more new transactions at the computer replay system from the one or more data sources; and after providing sequentially the one or more second transactions to the first user, providing sequentially the one or more new transactions to the first user.

14. The computer replay system of claim 13, wherein the computing instructions are further configured to perform an act of:

before providing sequentially the one or more new transactions to the first user, filtering the one or more new transactions to include one or more third records, wherein:

providing sequentially the one or more new transactions to the first user comprises:

providing sequentially the one or more third records of the one or more new transactions to the first user.

15. The computer replay system of claim 13, wherein:

the one or more new transactions are provided to the first user in real time before any storage of the one or more new transactions.

16. The computer replay system of claim 11, wherein:

updating the current state of the one or more first records in the historical database comprises:

determining one or more third transactions of the one or more first transactions that occurred within a first predetermined time period; and updating the historical database with a composite record based on the one or more third transactions.

17. The computer replay system of claim 11, wherein the computing instructions are further configured to perform an act of:

after determining the one or more second transactions in the transactional database that occurred after the first moment, determining at least one fourth transaction of the one or more second transactions in the transactional database in which a change in one or more predetermined records occurred.

18. The computer replay system of claim 11, wherein the computing instructions are further configured to perform an act of:

determining a replay rate for providing the one or more second transactions to the first user, wherein:

providing sequentially the one or more second transactions to the first user comprises:

providing sequentially at the replay rate the one or more second transactions from the transactional database to the first user.

19. The computer replay system of claim 18, wherein:

the replay rate is faster or slower than a receiving rate at which the computer replay system received the one or more first transactions.

20. The computer replay system of claim 11, wherein the computing instructions are further configured to perform acts of, before receiving the one or more first transactions at the computer replay system from the one or more data sources:

creating the historical database; and creating the transactional database.

* * * * *